(12) United States Patent
Popovich

(10) Patent No.: US 7,696,987 B2
(45) Date of Patent: Apr. 13, 2010

(54) TOUCH PANEL AND METHOD OF MANUFACTURING THE SAME

(75) Inventor: David Gregory Popovich, Ottawa (CA)

(73) Assignee: SMART Technologies ULC (CA)

( * ) Notice: Subject to any disclaimer, the term of this patent is extended or adjusted under 35 U.S.C. 154(b) by 917 days.

(21) Appl. No.: 11/071,452

(22) Filed: Mar. 4, 2005

(65) Prior Publication Data

US 2006/0197749 A1 Sep. 7, 2006

(51) Int. Cl.
*G09G 5/00* (2006.01)

(52) U.S. Cl. ...................... 345/179; 178/19.01

(58) Field of Classification Search ........... 345/173, 345/179; 178/18.01–18.09, 19.01–19.06
See application file for complete search history.

(56) References Cited

U.S. PATENT DOCUMENTS

| | | | | |
|---|---|---|---|---|
| 2,907,824 A | * | 10/1959 | Peek, Jr. .................... | 178/18.05 |
| 4,319,078 A | * | 3/1982 | Yokoo et al. .............. | 178/18.05 |
| 4,520,357 A | * | 5/1985 | Castleberry et al. ........... | 345/85 |
| 4,890,096 A | * | 12/1989 | Taguchi et al. .............. | 345/174 |
| 4,956,526 A | * | 9/1990 | Murakami et al. ........ | 178/18.08 |
| 5,401,916 A | * | 3/1995 | Crooks ..................... | 178/18.03 |
| 5,510,813 A | | 4/1996 | Makinwa et al. | |
| 5,610,629 A | * | 3/1997 | Baur ........................... | 345/104 |
| 6,369,806 B1 | * | 4/2002 | Endo et al. ................... | 345/174 |
| 7,249,950 B2 | * | 7/2007 | Freeman et al. .............. | 434/155 |
| 2001/0006383 A1 | * | 7/2001 | Fleck et al. .................. | 345/179 |
| 2002/0149571 A1 | | 10/2002 | Roberts | |
| 2003/0234769 A1 | | 12/2003 | Cross et al. | |
| 2005/0237309 A1 | * | 10/2005 | Sharma ....................... | 345/173 |

FOREIGN PATENT DOCUMENTS

| JP | 09167056 A | * | 6/1997 |
|---|---|---|---|
| JP | 10301510 A | * | 11/1998 |

* cited by examiner

*Primary Examiner*—Amr Awad
*Assistant Examiner*—Stephen G Sherman
(74) *Attorney, Agent, or Firm*—Katten Muchin Rosenman LLP

(57) ABSTRACT

A touch panel includes an input registration structure comprising a biasable medium layer. A generally inflexible cover is disposed on the input registration structure and defines a touch surface. A pointer biases the biasable medium layer at a position adjacent the pointer when the pointer is positioned proximate the touch surface. The input registration structure generates a position signal corresponding to the position of the pointer in relation to the touch surface.

43 Claims, 4 Drawing Sheets

TOUCH PANEL AND METHOD OF MANUFACTURING THE SAME

FIELD OF THE INVENTION

The present invention relates generally to interactive display systems and, more particularly, to a touch panel and method of manufacturing the same.

BACKGROUND OF THE INVENTION

Touch panels, such as for example digitizers and analog resistive touch screens are known in the art. These touch panels typically include a conductive tensioned membrane defining a touch surface that is stretched tautly over and spaced from a conductive substrate. When a pointer is used to contact the tensioned membrane with sufficient activation force, the tensioned membrane deflects and contacts the conductive substrate thereby to make an electrical contact. Determining voltage changes induced by the electrical contact allows the position of pointer contact on the touch surface to be determined and a position signal corresponding to the position of pointer contact to be generated.

Touch panels of this nature are often used in conjunction with a display such as a liquid crystal display ("LCD") panel. In such cases, the touch panel is disposed over the display with images presented by the display being visible through the touch panel. In this manner, the touch panel and display combination permits touch interaction with a displayed graphical interface. Examples of touch panel and display implementations include tablet personal computers ("PCs") and personal digital assistants ("PDAs"). Although PCs and PDAs are widely accepted, as the touch panel is disposed over the display the visual quality of displayed images can be somewhat distorted.

When a user uses a pointer to provide touch input, the pointer is commonly held in the hand in the same manner as more traditional writing instruments, such as for example a pen, when used to write on paper. The fleshy part of the palm adjacent the little finger, if not also the forearm, is typically rested on the touch surface to provide stability. When this technique is used to provide touch input, the area of contact between the user's hand and the touch surface is detected as input, obscuring the actual pointer touch input. This condition is commonly referred to as "palm reject". As will be appreciated, improvements in touch panels to obviate or mitigate the above disadvantages are desired.

It is therefore an object of the present invention to provide a novel touch panel and method of manufacturing the same.

SUMMARY OF THE INVENTION

Accordingly, in one aspect of the present invention, there is provided a touch panel, comprising:

an input registration structure comprising a biasable medium layer;

a generally inflexible cover disposed on said input registration structure and defining a touch surface; and a pointer for biasing said biasable medium layer at a position adjacent said pointer when said pointer is positioned proximate said touch surface, said input registration structure generating a position signal corresponding to said pointer position.

In one embodiment, the input registration structure includes a pressure-sensitive layer arrangement adjacent the biasable medium layer for registering biasing of the biasable medium layer. The pressure sensitive layer arrangement includes two spaced, conductive resist layers that are brought into contact upon biasing of the bias able medium layer. The pointer magnetically biases the medium layer. The pressure-sensitive layer arrangement is placed intermediate the generally inflexible cover and the biasable medium layer and the pointer magnetically attracts the biasable medium layer.

In one embodiment, the biasable medium layer is ferromagnetic and includes a layer of ferrous paint applied to the flexible layer. The layer of ferrous paint can be continuous or discontinuous across the flexible layer. Alternatively, in another embodiment the biasable medium layer comprises a plurality of magnetically biasable objects, such as ball bearings.

The pointer may include a permanent magnet or an electromagnet to bias the biasable medium layer.

According to another aspect of the present invention, there is provided a method of manufacturing a touch panel, comprising:

providing a generally inflexible cover defining a touch surface; and coupling an input registration structure to one side of said generally inflexible cover, said input registration structure comprising a biasable medium layer, said input registration structure being operable to register the location of biasing of said biasable medium layer.

According to yet another aspect of the present invention, there is provided a touch panel, comprising:

an input registration structure comprising a magnetically biasable medium layer; and a generally inflexible cover disposed on said input registration structure, the surface of said cover opposite said input registration structure defining a touch surface.

The touch panel provides advantages in that, by using an input registration structure disposed on a generally inflexible cover that defines a touch surface opposite the input registration structure, the palm reject issues associated with conventional analog-resistive type touch panels are avoided. Additionally, accidental contact with the touch surface does not result in erroneous input being registered.

BRIEF DESCRIPTION OF THE DRAWINGS

Embodiments will now be described, by way of example only, with reference to the accompanying drawings, in which.

DETAILED DESCRIPTION OF THE EMBODIMENTS

Figure 1:
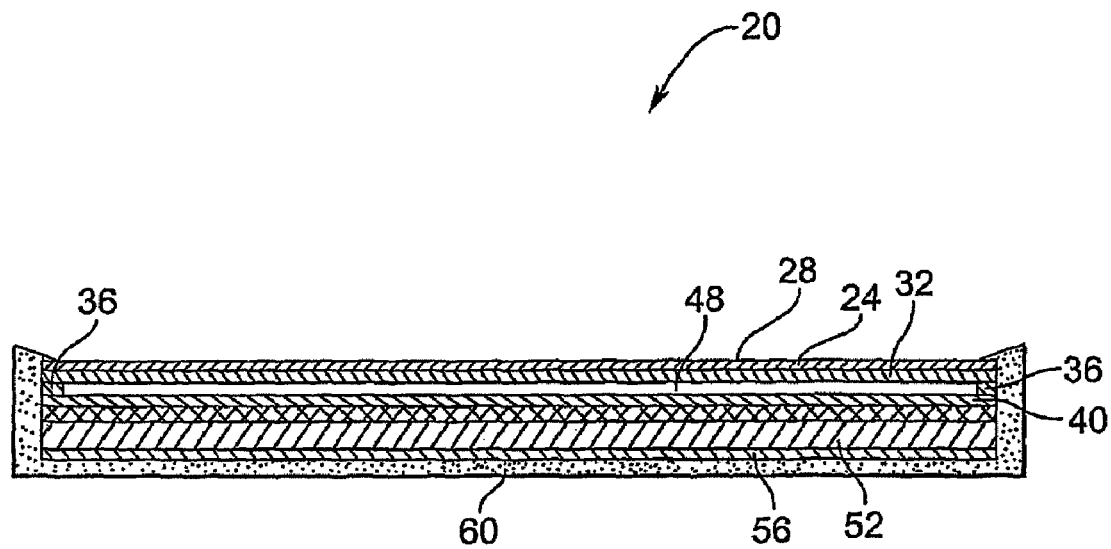
FIG. 1 is a side sectional view of a prior art touch panel.

For ease of understanding, a prior art touch panel of the analog-resistive type will firstly be described. Turning now to FIG. 1, a prior art touch panel is shown and is generally identified by reference numeral 20. The touch panel 20 is generally rectangular and includes an upper planar tensioned membrane 24. The upper surface of the tensioned membrane 24 defines a generally smooth touch surface 28. A conductive resistive layer 32 is applied to the undersurface of the tensioned membrane 24. A peripheral insulating spacer 36 spaces the resistive layer 32 from another conductive resistive layer 40 that is applied to the top surface of a rigid protective layer 44 to provide an air gap 48. The tension applied to the tensioned membrane 24 in conjunction with spacer 36 maintains separation between the resistive layer 32 and the resistive layer 40 in the absence of pointer contacts on the touch surface 28. The rigid protective layer 44 is disposed above a display panel 52. Each of the tensioned membrane 24, the resistive layers 32, 40, and the rigid protective layer 44 are generally transparent to permit viewing of the display panel 52 from atop of the touch surface 28. Adjacent the underside of the display panel 52 is a backing panel 56 to support and secure the display panel 52. An aluminum frame 60 encases and securely holds the components of the touch panel 20.

The tensioned membrane 24 is a flexible, low creep film such as, for example, polyethylene terephthalate ("PET"). The tensioned membrane 24 serves to protect the resistive layers 32, 40 from damage as a result of physical contact, while maintaining sensitivity to pointer contact on the touch surface 28.

The resistive layers 32, 40 each comprise a layer of Indium tin oxide. The peripheral insulating spacer 36 is formed of electrically insulating material such as rigid polyvinyl chloride (RPVC), acrylonitrile butadiene styrene (ABS), acrylic or fiberglass reinforced plastic (FRP). The rigid protective layer 44 is typically made of glass or plexiglass.

When a pointer is used to contact the tensioned membrane 24 with sufficient activation force, the tensioned membrane 24 deflects into the gap 48 and contacts the resistive layer 40 at the pointer contact position. Voltage changes induced by the electrical contact between the resistive layers 32, 40 are sensed allowing the position of the pointer contact to be determined and a corresponding position signal to be generated.

As touch input is registered whenever the tensioned membrane 24 is deflected into the gap 48 to bring resistive layer 32 into contact with the resistive layer 40, accidental contacts with the tensioned membrane are often interpreted as touch input. Additionally, the touch panel 20 suffers from the "palm reject" problem discussed previously if the user places his hand on the touch surface 28 during writing on the touch surface 28 using a pointer with sufficient pressure to deflect the tensioned member 24 and bring the resistive layer 32 into contact with the resistive layer 40.

Figure 2:
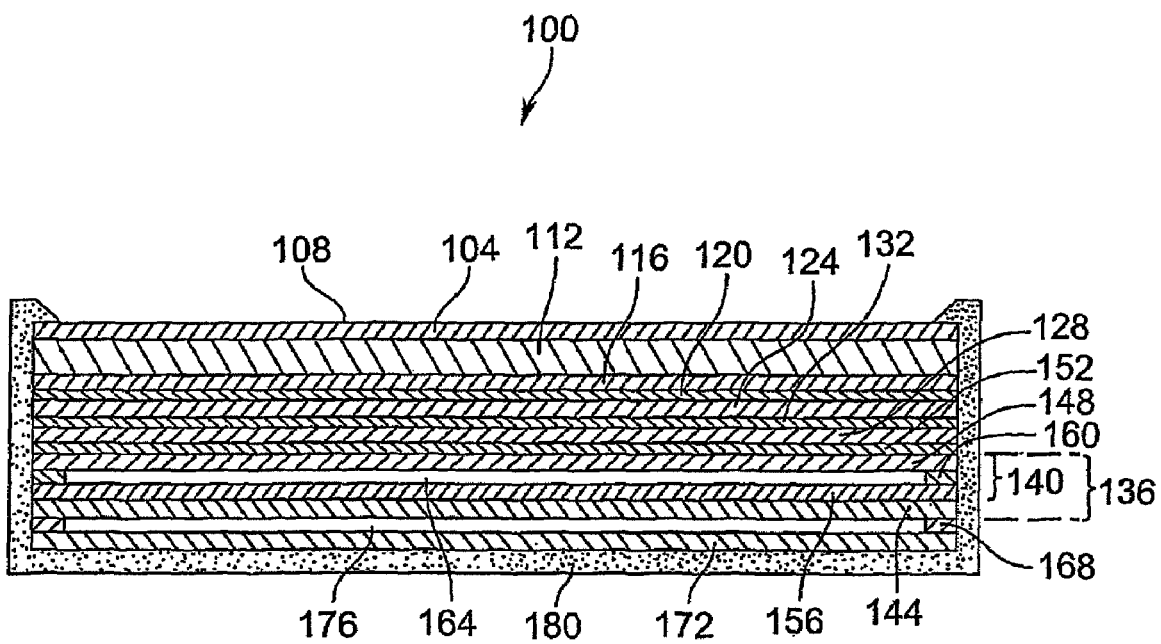
FIG. 2 is a side sectional view of one embodiment of a touch panel.

Turning to FIG. 2, an embodiment of a touch panel is shown generally at 100. The construction of the touch panel 100 will be described relative to its illustrated orientation, although those skilled in the art will understand that the touch panel 100 can be used in other orientations. Touch panel 100 has a protective top cover 104 that is generally inflexible, the upper surface of which defines a touch surface 108. The protective top cover 104 overlays a display panel 112. The protective top cover 104 in this example is a sheet of Lexan® which, due to its generally inflexible nature, protects the display panel 112. The Lexan sheet is transparent to permit viewing of images presented by the display panel 112. The display panel 112 is an LCD or other suitable panel for generating and presenting images.

An insulating layer 116 made of polyester is disposed below the display panel 112. The insulating layer 116 is affixed via a layer of glue 120 to a rigid layer 124 of aluminum. The insulating layer 116 electrically insulates the conductive aluminum rigid layer 124 from the underlying circuitry of the display panel 112. The rigid layer 124 supports the display panel 112 and prevents it from flexure. Another insulating layer 128 is adhered to the underside of the rigid layer 124 via a layer of glue 132.

Situated underneath the insulating layer 128 is an input registration structure 136. The input registration structure 136 comprises a pressure-sensitive analog resistive layer arrangement 140 and a biasable medium layer 144 below the analog resistive layer arrangement 140. The pressure-sensitive analog resistive layer arrangement 140 comprises a carbon resist layer 148 affixed to the second insulating layer 128 via a layer of glue 152, and separated from another carbon resist layer 156 by a peripheral air gap spacer 160 to maintain an air gap 164 between the carbon resist layers 148 and 156. Carbon resist layer 156 is disposed on the biasable medium layer 144. A peripheral air gap spacer 168 separates the biasable medium layer 144 from a support layer 172 to maintain an air gap 176 therebetween. The air gap 176 allows the carbon resist layer 156 to be biased towards the carbon resist layer 148 with little air pressure resistance. The peripheral air gap spacers 160, 168 are formed of electrically insulating material such as rigid polyvinyl chloride (RPVC), acrylonitrile butadiene styrene (ABS), acrylic or fiberglass reinforced plastic. An aluminum frame 180 encases and securely holds the components of the touch panel 100.

Each of the carbon resist layers 148 and 156 includes a set of thin parallel "wires", with the wires of one carbon resist layer being oriented transverse to the wires of the other carbon resist layer. The carbon resist layer 156 is a thin flexible film that is adhered to the peripheral air gap spacer 160 under tension.

In this embodiment, the biasable medium layer 144 is a relatively thin, continuous coating of ferrous paint that is applied to the underside of the carbon resist layer 156. The ferrous paint comprises ferrous particles suspended in a carrier of acrylic paint. The acrylic paint completely coats the ferrous particles to provide electrical insulation from the carbon resist layer 156. The coat of ferrous paint is sufficiently thin so as not to induce significant sag in the carbon resist layer 156. The ferrous particles are ferromagnetic; that is, they are attracted to a magnetic force.

Figure 3:
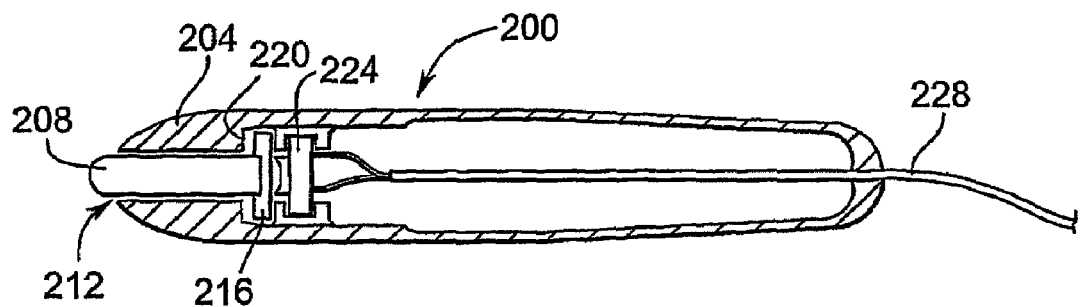
FIG. 3 is a schematic sectional representation of a pointer for use with the touch panel of FIG. 2.

FIG. 3 shows a pointer 200 for use with the touch panel 100 of FIG. 2. Pointer 200 comprises a generally cylindrical housing 204 having a tip 208 protruding from a passage 212 at one end of the housing 204. A retainer ring 216 is secured to the interior end of the tip 208 and is accommodated in a stepped region of the passage 212. The retainer ring 216 abuts a shoulder 220 defined by the step in the passage to limit the outward travel of the tip 208 along the passage 212.

A pressure-activated switch 224 is disposed in the housing 204 beyond the interior end of the tip 208. The switch 224 is activated when pressure is applied to the distal end of the tip 208 that is sufficient to urge the tip into the channel 212 and against the switch 224. A wire 228 is coupled to the switch 224 and exits the rear end of the pointer 200 to electrically couple the switch 224 to the touch panel 100.

The tip 208 is a generally cylindrical permanent magnet that generates a magnetic field and has a rounded distal end to permit smooth travel of the tip 208 across the touch surface 108.

The pointer 200 can be conditioned between two modes. When the tip 208 is urged into the channel 212 via contact with the touch surface 108 and activates the switch 224, the pointer 200 is conditioned to a "touch mode". Alternatively, when the switch 224 is not activated, the pointer 200 is conditioned to a "hover mode".

Figure 4:
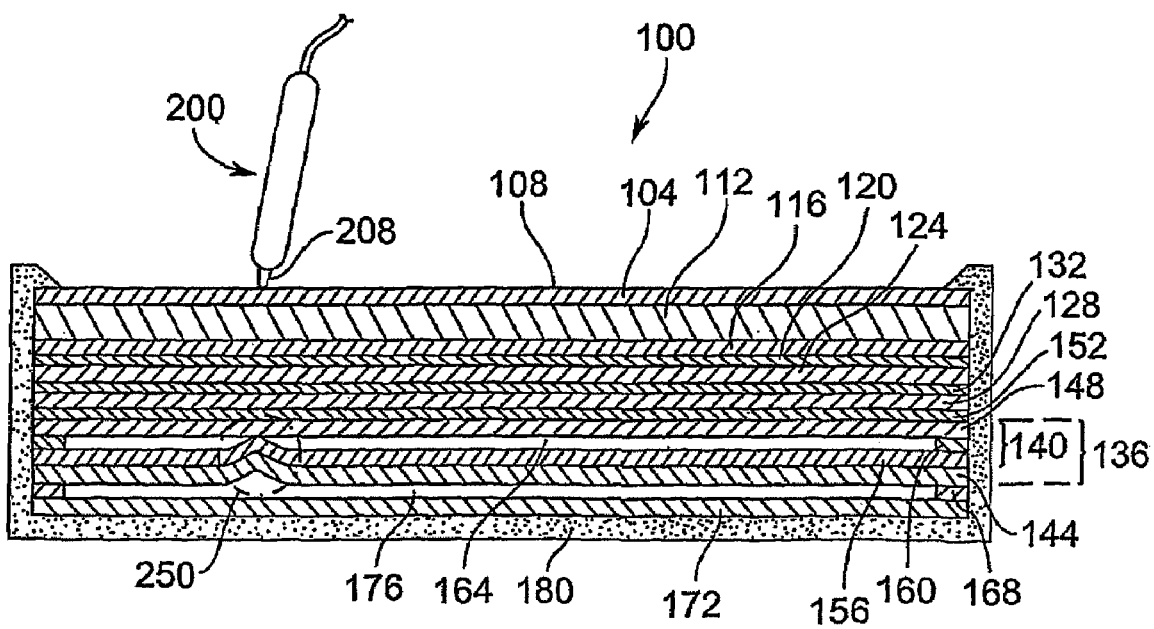
FIG. 4 is a side sectional view of the touch panel and the pointer of FIGS. 2 and 3 respectively, in a touch mode.
Figure 5:
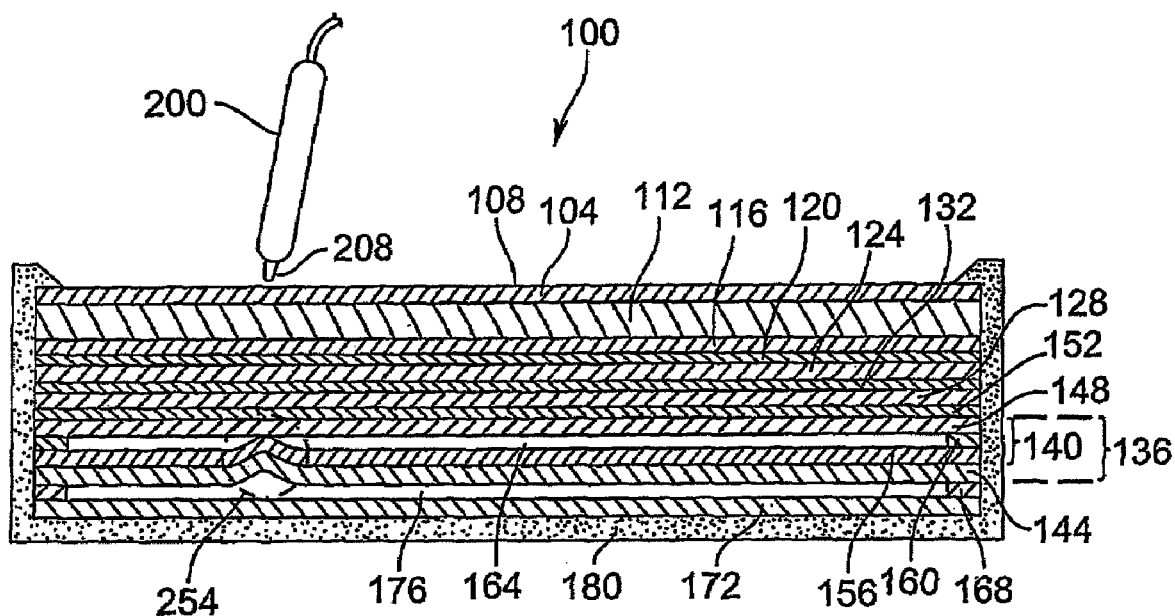
FIG. 5 is a side sectional view of the touch panel and the pointer of FIGS. 2 and 3 respectively, in a hover mode.

FIGS. 4 and 5 show the pointer 200 in use with the touch panel 100. In FIG. 4, the pointer 200 is shown in contact with the touch surface 108 such that the tip 208 is urged into the channel 212 and activates the switch 224. As a result, the pointer 200 is conditioned to the touch mode.

With the tip 208 of the pointer 200 in contact with the touch surface 108, the biasable medium layer 144 is attracted by the magnetic field generated by the pointer tip 208 at a location proximate to the point of contact of the pointer tip 208 with the touch surface 108 as shown generally at 250. As a result, the biasable medium layer 144 urges the carbon resist layer 156 to which it is coupled upwards and into contact with the carbon resist layer 148 at that location. With the carbon resist layers 148 and 156 in contact, the pointer position is determined in a known manner by applying a voltage to the wires of one resist layer and reading the potential on the wires of the other resist layer and then by applying a voltage to the wires of the other resist layer and reading the potential on the wires of the one resist layer.

In the touch mode, as shown in FIG. 4, the activated switch 224 of the pointer 200 completes a circuit with the touch panel 100. The touch panel 100 interprets the completed circuit as an indication that the pointer 200 is in the touch mode. Thus, the input registered by the touch panel as a result of contact between the carbon resist layers 148 and 156 is deemed to be touch input. In response, the touch panel 100 generates a position signal that is transmitted to a computing device to which the touch panel 100 is coupled, along with the mode of the pointer 200 (i.e. touch).

In FIG. 5, the pointer 200 is shown positioned proximate to the touch panel 100, but is either not in contact with the touch surface 108 or the contact is not sufficient to activate the switch 224 of the pointer 200. As a result, the pointer 200 is conditioned to the hover mode.

As the tip 208 of the pointer 200 generates a magnetic field regardless of whether the pointer 200 is in the touch or hover mode, in the hover mode the biasable medium layer 144 is still attracted by the pointer tip 208. As a result, the biasable medium layer 144 presses against the second carbon resist layer 156. In this manner, the second carbon resist layer 156 is urged into contact with the carbon resist layer 148 as shown generally at 254 to register the input.

In the hover mode, the switch 224 of the pointer 200 does not complete the circuit with the touch panel 100. The touch panel 100 interprets the open circuit as an indication that the pointer 200 is in the hover mode. Thus, the input registered by the touch panel 100 as a result of contact between the carbon resist layers 148 and 156 is deemed to be hover input. In response, the touch panel 100 generates a position signal that is transmitted to the computing device along with the mode of the pointer 200 (i.e. hover).

As will be appreciated, the touch panel 100 avoids the "palm reject" problems described previously as input is registered by magnetically biasing a pressure-sensitive analog resistive layer arrangement within the touch panel.

While, in the above-described embodiment, the biasable medium layer 144 is a layer of ferrous paint applied in a continuous coat to the carbon resist layer 156, it may be advantageous to apply the paint in a discontinuous manner to the second carbon resist layer. By reducing the surface area of the coat of paint, the weight of the paint, which is related to sag, can be reduced and/or the thickness of the paint can be increased to improve the ferromagnetic response of the paint.

Figure 6A:
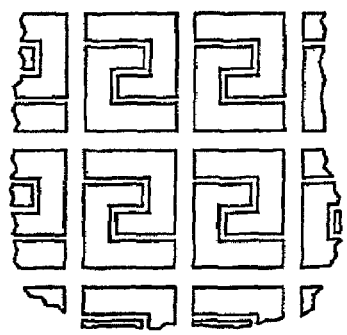
FIGS. 6*a* and 6*b* show alternative biasable medium layers for use with the touch panel of FIG. 2.
Figure 6B:
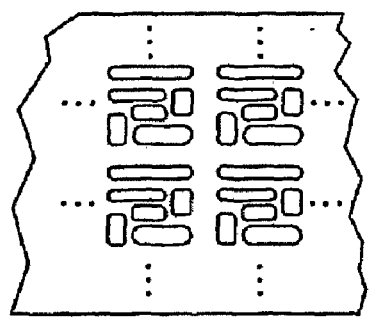

FIGS. 6a and 6b illustrate alternative patterns for application of the ferrous paint to the carbon resist layer 156. Both patterns are generated using a silk-screening process. As can be seen, the patterns are not continuous and provide for reduced areas of paint coverage. The patterns are, however, generally repeating such that no point on the carbon resist layer 156 is further than a set distance from ferrous paint to ensure suitable responsiveness across the second carbon resist layer 156.

Figure 7:
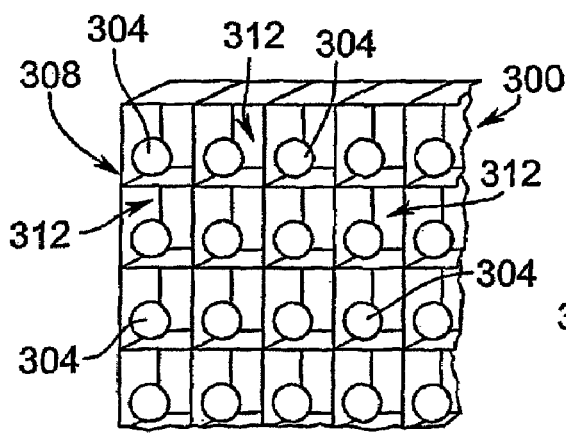
FIG. 7 is a partial sectional view of yet another alternative biasable medium layer comprising a number of ball bearings.

FIG. 7 shows yet another alternative biasable medium layer 300 for use with the touch panel 100 comprising a plurality of magnetically biasable objects. In this example, the biasable objects are ball bearings 304 disposed in a grid separator 308. The ball bearings 304 are made of a ferromagnetic metal, typically carbon steel.

The grid separator 308 is manufactured from a material that does not interfere with the magnetic biasing of the ball bearings 304, such as a resilient plastic. The grid separator 308 defines a number of cells 312 that are cuboid and have dimensions larger than those of the ball bearings 304 to allow the ball bearings 304 to freely float within the cells. By using the grid separator 308, a generally even distribution of ball bearings 304 across the biasable medium layer 300 is maintained. The cells 312 are open along one side to allow the ball bearings 304 to protrude from the open side. When the biasable medium layer 300 is employed in the touch panel 100, the open sides of the cells 312 face the carbon resist layer 156 to permit the ball bearings 304 to impinge thereon when magnetically attracted by the pointer 200.

When the pointer 200 is brought proximate to the touch surface 108, the magnetic field generated by the pointer tip 208 attracts the ball bearing 304 adjacent the pointer. The ball bearing 304 in turn moves upward within its cell 312. The upper portion of the ball bearing 304 that projects above the grid separator 308 contacts the carbon resist layer 156 and urges it into contact with the carbon resist layer 148 thereby to register input.

Figure 8:
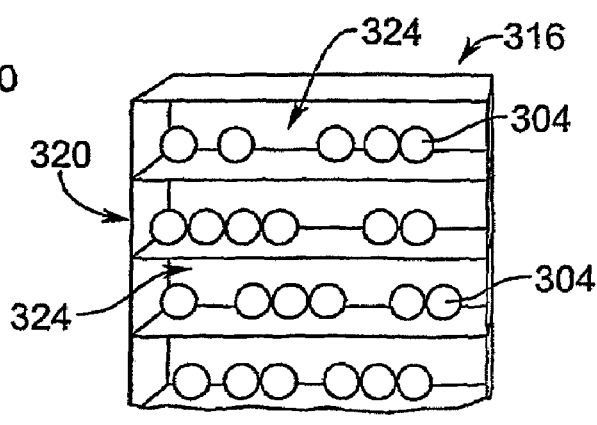
FIG. 8 is a partial sectional view of the biasable medium layer of FIG. 7 with an alternative separator.

FIG. 8 shows yet another alternative biasable medium layer 316 that is similar to the biasable medium layer 300 of FIG. 7. In this example, a channel separator 320 is used in place of the grid separator 308. The channel separator 320 has lateral channels 324 dimensioned larger than the ball bearings 304 such that free flotation of the ball bearings 304 along the channels 324 is permitted. Use of the channel separator 320 maintains a generally even distribution of the ball bearings 304 along one dimension of the biasable medium layer 316. The ball bearings 304 generally distribute themselves along a second dimension (i.e. along the channels 324). If the touch panel is to be operated at least partially upright, the channels 324 can be aligned horizontally to maintain the generally even distribution of the ball bearings 304.

The channels 324 are open along one side to allow the ball bearings 304 to protrude from the open side. When the biasable medium layer 316 is employed in the touch panel 100, the open sides of the channels 324 face the carbon resist layer 156 to permit the ball bearings 304 to impinge thereon when magnetically attracted by the pointer 200.

Figure 10:
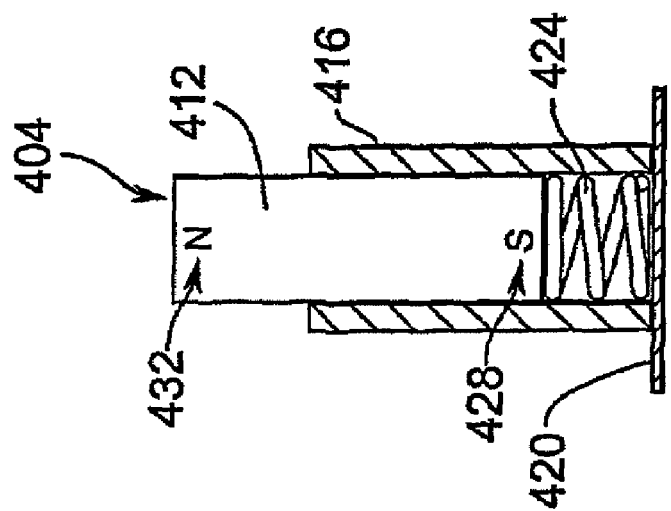
FIG. 10 is a sectional view of a biasable component used in the touch panel of FIG. 9.
Figure 9:
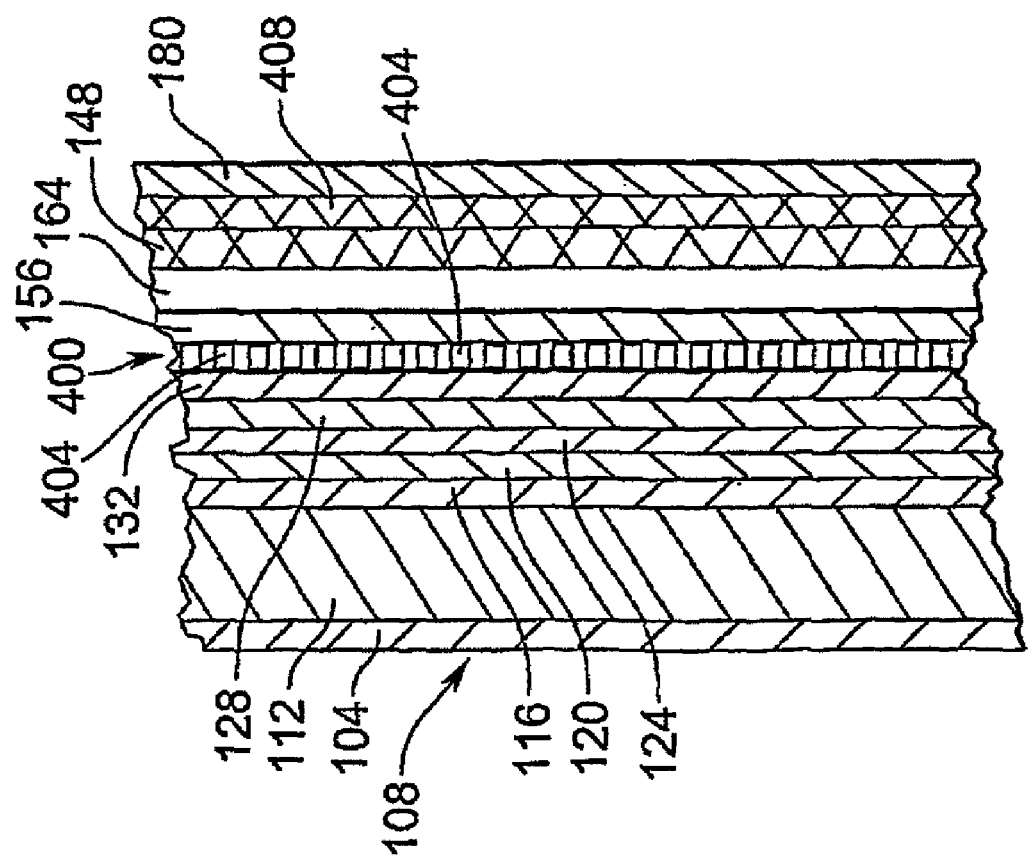
FIG. 9 is a side sectional view of another embodiment of a touch panel employing biasable components.

FIGS. 9 and 10 show another embodiment of the touch panel 100. In this example, touch panel 100 has a biasable medium layer 400 interposed between the insulation layer 128 and the pressure-sensitive layer arrangement 140. The input registration structure 136 is reversed such that the carbon resist layer 156 is positioned above carbon resist layer 148. A secondary insulation layer 408 is positioned between the carbon resist layer 148 and the aluminum frame 180.

Biasable medium layer 400 includes an array of biasable components 404. Each biasable component 404 comprises a cylindrical magnet 412 slidably received in one end of a tube 416. The magnet 412 and the tube 416 are dimensioned to permit air flow along the side of the magnet 412 when the magnet 412 is moved through the tube 416. The other end of the tube 416 is secured to a mounting plate 420 that extends outside the circular profile of the tube 416. The mounting plate provides a surface 420 to secure adhesively the tube 416 to the insulation layer 128. In FIG. 10, the magnet 412 is shown held in a neutral position within the tube 416 by a spring 424 that resists movement of the magnet 412 in either direction through the tube 416. The magnet 412 is secured to the spring 424 at the South pole 428 thereof, with the North pole 432 protruding from the tube 416.

When the pointer 200 radiating a South magnetic force is placed proximal to the touch surface 108, the magnet 412 of the biasable component 404 nearest the pointer 200 is urged away from the pointer due to the polarity of the magnet 412. As a result, the magnet 412 is pushed out of the tube 416 and towards the carbon resist layer 156. The impingement of the magnet 412 against the carbon resist layer 156 causes it to span the gap 148 and contact the carbon resist layer 148 to register input. Upon removal of the magnetic force of the pointer 200 from the touch surface 108, the magnet 412 returns to the neutral position under the bias of the spring 424.

Figure 11:
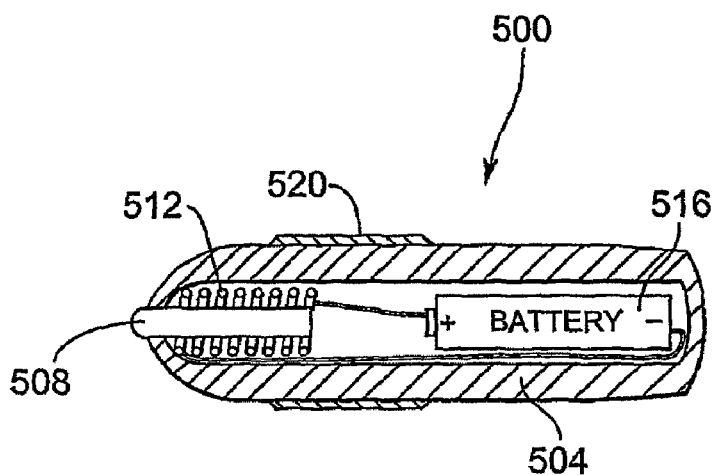
FIG. 11 is a schematic sectional representation of an alternative pointer for use with the touch panel of FIG. 2.

FIG. 11 shows another pointer 500 for use with the touch panel 100. Instead of a permanent magnet, the pointer 500 employs a solenoid to generate an electromagnetic field. The pointer 500 has a cylindrical main body 504 and an iron tip 508 protruding from one end of the main body 504. Unlike pointer 200, the tip 508 is fixed to the body 504. An electrical coil 512 encircles the iron tip 508 within the body 504 and is connected to a battery 516 housed in the main body 504. Two conductive elastomer grips 520 are positioned on the exterior of the main body 504 and are connected to the battery 516. Upon contact with the skin of a user, a circuit is formed through the elastomer grips 520. When the circuit is completed, the electrical coil 512 is electrically coupled to the battery 516. As a result, an electromagnetic field is generated along the iron tip 508 for biasing the biasable medium layer of the touch panel.

While the pointer is described as having a permanent magnet or an electromagnet, those of skill in the art will appreciate that other types of pointers can be used. If desired, rather than determining hover or contact based on pointer output, hover and contact input can be differentiated by determining the strength of the input, given a known magnetic force generated by the pointer. Where magnetically biasable elements are used, the point of contact of the pointer can be larger when the pointer is contacting the touch surface. The effects of positioning the pointer at different elevations above the touch surface can be determined and used to classify registered input as touch or hover contact. Also if desired, the touch panel can be conditioned to treat all input as touch input.

Although the touch panel is described as including a display panel for presenting images that are visible through the top cover, if desired, the display panel and protective top cover can be replaced with an opaque layer for tablet or whiteboard applications.

An optical registration layer can be used in place of the pressure-sensitive analog resistive layer arrangement. In this case, one or more cameras and light sources are positioned to look along the plane of the biasable medium layer and detect movement therealong thereby to detect point contact. Alternatively, a capacitive arrangement can be used in lieu of the pressure-sensitive analog resistive layer arrangement as well.

If desired, the ferrous paint can be imbued with a permanent charge, thereby reducing the magnetic force required to bias the biasable medium layer to bring the carbon resist layers into contact with one another in response to pointer input.

In the embodiments employing a biasable medium layer including ball bearings, those of skill in the art that other types and shapes of magnetically biasable objects may of course be used.

Although a number of embodiments of the touch panel have been described and illustrated, those of skill in the art will appreciate that variations and modifications may be made without departing from the spirit and scope thereof as defined by the appended claims.

What is claimed is:

1. A touch panel system, comprising a touch panel and at least one magnetic pointer, said touch panel comprising:
   an input registration structure comprising a generally planar, unitary flexible layer;
   a generally inflexible cover disposed on said input registration structure and defining a touch surface; and
   a display panel intermediate said generally inflexible cover and said input registration structure;
   wherein when said pointer is positioned proximate said touch surface, said pointer magnetically attracts said flexible layer adjacent said pointer causing only a portion of said flexible layer adjacent said pointer to flex towards said pointer out of plane, flexing of said flexible layer portion towards said pointer causing said input registration structure to generate a position signal corresponding to said pointer position that is transmitted to a computing device.

2. The touch panel system of claim 1, wherein said input registration structure further comprises a pressure-sensitive layer arrangement adjacent said flexible layer, said pressure-sensitive layer arrangement sensing flexing of said flexible layer portion.

3. The touch panel system of claim 2, wherein said pressure-sensitive layer arrangement includes two spaced, conductive resist layers, said resist layers being brought into contact upon flexing of said flexible layer portion.

4. The touch panel system of claim 2, wherein said pressure-sensitive layer arrangement is positioned between said cover and said flexible layer.

5. The touch panel system of claim 4, wherein said flexible layer is ferromagnetic.

6. The touch panel system of claim 5, wherein said flexible layer comprises a layer of ferrous paint applied to a flexible substrate.

7. The touch panel system of claim 6, wherein said layer of ferrous paint is discontinuous across said substrate.

8. The touch panel system of claim 7, wherein said layer of ferrous paint is applied to said substrate in a repeating pattern.

9. The touch panel system of claim 6, wherein said flexible layer is disposed on a support panel.

10. The touch panel system of claim 2, wherein said pointer comprises a permanent magnet.

11. The touch panel system of claim 2, wherein said pointer comprises an electromagnet.

12. The touch panel system of claim 11, wherein said pointer comprises a circuit that, when closed, activates said electromagnet.

13. The touch panel system of claim 1, wherein said pointer comprises a tip switch.

14. The touch panel system of claim 13, wherein said touch panel is conditioned to a touch mode when said tip switch is activated.

15. The touch panel system of claim 14, wherein said touch panel is conditioned to a hover mode when said tip switch is unactivated.

16. The touch panel system of claim 1, wherein said display panel is a liquid crystal display (LCD) panel.

17. A touch panel, comprising:
    an input registration structure comprising a generally planar, unitary flexible layer that flexes out of plane at discrete locations in response to magnetic forces applied to said flexible layer adjacent said discrete locations and a pair of spaced conductive resist layers adjacent said flexible layer, said resist layers being brought into contact upon flexing of said flexible layer;
    a generally inflexible cover disposed on said input registration structure, a surface of said cover opposite said input registration structure defining a touch surface on which touch input using a magnetic pointer that applies said magnetic forces to said flexible layer can be made; and
    a display panel intermediate said generally inflexible cover and said input registration structure;
    wherein flexing of said flexible layer causes said input registration structure to generate a position signal corresponding to said pointer position that is transmitted to a computing device.

18. The touch panel of claim 17, wherein said flexible layer comprises a layer of ferrous paint applied to a flexible substrate.

19. A touch panel system, comprising a touch panel and at least one magnetic pointer, said touch panel comprising:
    an input registration structure comprising a biasable layer comprising an array of movable magnetic objects, and a pair of spaced, conductive resist layers;
    a generally inflexible cover disposed on said input registration structure and defining a touch surface; and
    a display panel intermediate said generally inflexible cover and said input registration structure;
    wherein when said pointer is positioned proximate said touch surface, said pointer biases magnetic objects of said biasable layer that are positioned adjacent said pointer thereby causing said biased magnetic objects to move and bring said resist layers into contact with one another, said input registration structure of said touch panel generating a position signal corresponding to said pointer position in response to contact of said resist layers that is transmitted to a computing device.

20. The touch panel system of claim 19, wherein said pointer magnetically attracts the magnetic objects.

21. The touch panel system of claim 20, wherein said magnetic objects are ferromagnetic.

22. The touch panel system of claim 21, wherein said magnetic objects are ball bearings.

23. The touch panel system of claim 20, wherein said biasable layer further comprises a separator for maintaining said magnetic objects in a desired distribution.

24. The touch panel system of claim 23, wherein said separator is a grid separator.

25. The touch panel system of claim 23, wherein said separator is a channel separator.

26. A touch panel, comprising:
    an input registration structure comprising a magnetically biasable layer and a pair of spaced, conductive resist layers, said magnetically biasable layer comprising a plurality of distributed movable magnetic objects, said magnetic objects being moveable to bring said resist layers into contact in response to applied magnetic forces to generate a position signal that is transmitted to a computing device;
    a display panel disposed on said input registration structure; and
    a generally inflexible cover disposed on said display panel, a surface of said cover opposite said display panel defining a touch surface on which touch input using a magnetic pointer that applies said magnetic forces to said magnetic objects can be made.

27. The touch panel of claim 26, wherein said resist layers are intermediate said magnetically biasable layer and said display panel.

28. A touch panel system, comprising a touch panel and at least one magnetic pointer, said touch panel comprising:
    an input registration structure comprising a generally planar, unitary pliable layer;
    a generally inflexible cover disposed on said input registration structure and defining a touch surface; and
    a display panel intermediate said generally inflexible cover and said input registration structure;
    wherein when said pointer is positioned proximate said touch surface, said pointer magnetically biases said pliable layer towards said pointer and out plane at a position adjacent said pointer thereby causing deformation of said pliable layer only at said position and resulting in said input registration structure generating a position signal corresponding to said pointer position that is transmitted to a computing device.

29. The touch panel system of claim 28, wherein said input registration structure further comprises a pressure-sensitive layer arrangement adjacent said pliable layer, said pressure-sensitive layer arrangement detecting deformation of said pliable layer.

30. The touch panel system of claim 29, wherein said pressure-sensitive layer arrangement includes two spaced, conductive resist layers, said resist layers being brought into contact upon deformation of said pliable layer.

31. The touch panel system of claim 29, wherein said pressure-sensitive layer arrangement is positioned between said cover and said pliable layer.

32. The touch panel system of claim 31, wherein said pliable layer is ferromagnetic.

33. The touch panel system of claim 32, wherein said pliable layer comprises a layer of ferrous paint applied to a substrate.

34. The touch panel system of claim 33, wherein said layer of ferrous paint is discontinuous across said substrate.

35. The touch panel system of claim 34, wherein said layer of ferrous paint is applied to said substrate in a repeating pattern.

36. The touch panel system of claim 33, wherein said pliable layer is disposed on a support panel.

37. The touch panel system of claim 29, wherein said pointer comprises a permanent magnet.

38. The touch panel system of claim 29, wherein said pointer comprises an electromagnet.

39. The touch panel system of claim 38, wherein said pointer comprises a circuit that, when closed, activates said electromagnet.

40. The touch panel system of claim 28, wherein said pointer comprises a tip switch.

41. The touch panel system of claim 40, wherein said touch panel is conditioned to a touch mode when said tip switch is activated.

42. The touch panel system of claim 41, wherein said touch panel is conditioned to a hover mode when said tip switch is unactivated.

43. The touch panel system of claim 28, wherein said display panel is an LCD panel.

* * * * *